United States Patent [19]

Schnetzka et al.

[11] Patent Number: 4,499,534

[45] Date of Patent: Feb. 12, 1985

[54] CONTROL SYSTEM FOR CONTROLLING AN SCR NETWORK TO REGULATE THREE-PHASE A-C POWER FLOW

[75] Inventors: Harold R. Schnetzka, Spring Grove; Frank E. Wills; Dean K. Norbeck, both of York, all of Pa.

[73] Assignee: Borg-Warner Corporation, Chicago, Ill.

[21] Appl. No.: 434,018

[22] Filed: Oct. 12, 1982

[51] Int. Cl.³ ............................................. H02P 13/24
[52] U.S. Cl. .................................... 363/129; 323/320; 323/326; 363/87
[58] Field of Search .................... 363/87, 84, 128, 129; 323/237, 241–243, 320, 326; 307/252 P, 252 Q; 318/345 C

[56] References Cited

U.S. PATENT DOCUMENTS

| | | | |
|---|---|---|---|
| 4,053,945 | 10/1977 | Dumas | 363/129 |
| 4,315,305 | 2/1982 | Siemon | 363/88 |
| 4,376,968 | 3/1982 | Wueschinski et al. | 323/243 |
| 4,384,718 | 9/1982 | Vollrath | 363/87 |
| 4,463,415 | 7/1984 | Vollrath | 363/87 |
| 4,464,711 | 8/1984 | Hosokawa et al. | 363/129 |

OTHER PUBLICATIONS

Int. J. Electronics, vol. 47, No. 2, pp. 139–145, Aug. 1979.
Alden et al., "Thyristor DC Motor Drive with Single Phase Locked Equidistant Pulse Generation", Canadian Communications and Power Conference, Montreal, Canada (Oct. 15–17, 1980).

Primary Examiner—William H. Beha, Jr.
Attorney, Agent, or Firm—James E. Tracy

[57] ABSTRACT

The power delivered from a three-phase A-C power source and through a network of SCR's (connected, for example, to form a full wave rectifier bridge or to provide an A-C switch) to a load circuit is adjusted by controlling the conduction angles of the SCR's. The control is achieved by developing, from only one of the three alternating phase voltages provided by the A-C power supply, a reference square wave signal of the same frequency and whose amplitude excursions are precisely synchronized or keyed to the zero voltage crossings of the selected phase voltage, even though that phase voltage may include undesired harmonics, noise, transients or other distortion components. Since the influence of the undesired signal components has now been eliminated and since the reference square wave signal also has a fixed phase relationship with the other two phase voltages, logic circuitry may be controlled by the reference square wave signal, and by a d-c control voltage representing a desired power flow to the load circuit, to produce gating signals for triggering the SCR's into conduction at the angles required to translate the desired power to the load circuit. With this arrangement, control of all three phases is made immune to undesired signal components in any of the phase voltages.

8 Claims, 3 Drawing Figures

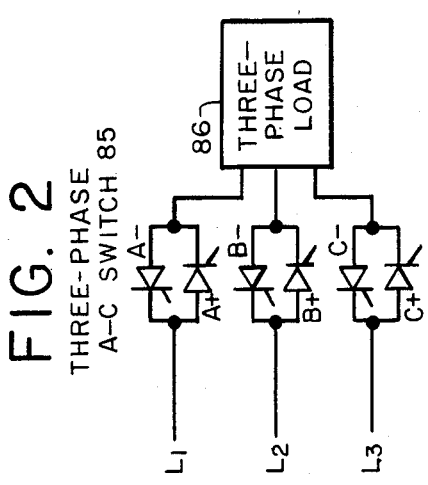
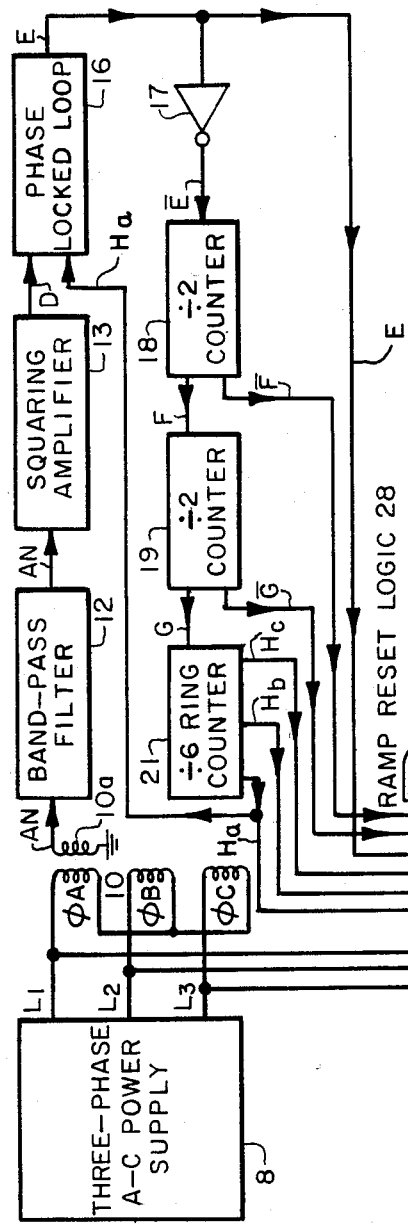
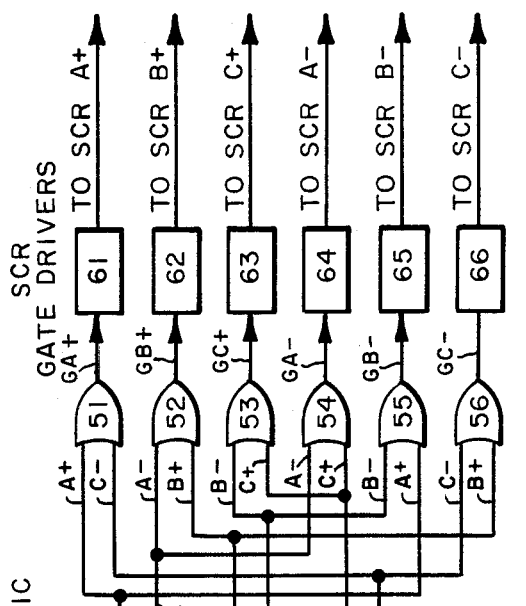
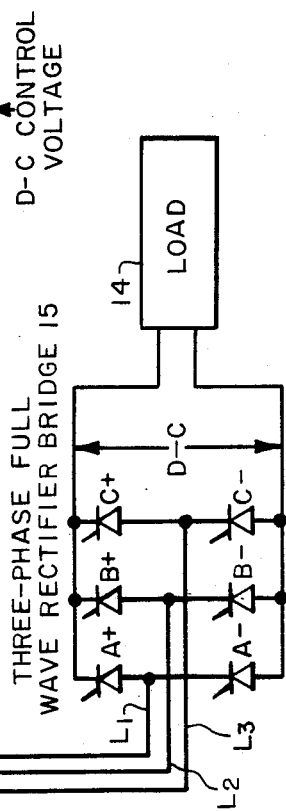
FIG. 2
FIG. 1

CONTROL SYSTEM FOR CONTROLLING AN SCR NETWORK TO REGULATE THREE-PHASE A-C POWER FLOW

BACKGROUND OF THE INVENTION

This invention relates to a control system for regulating the conduction angles of a network of SCR's (silicon controlled rectifiers) to vary the power translated from a three-phase A-C power source to a load circuit, while at the same time protecting the control system against undesired signal components in the three phase voltages that may otherwise preclude accurate control over the power delivered to the load circuit.

When the load circuit must be powered by an adjustable amplitude d-c voltage, such as is the case, for example, when the load takes the form of an inverter which in turn operates an a-c motor, the SCR network may comprise a three-phase full wave rectifier bridge having three pairs of SCR's, to each of which pairs is applied a respective one of the three alternating phase voltages provided by the three-phase A-C power supply and received from the power supply over three line conductors. The conduction angles of the six SCR's are controlled in order to establish at the output of the bridge a d-c voltage of a desired magnitude and to control the power supplied through the inverter to the a-c motor. More specifically, the power flow is adjusted by regulating the conduction angles of the SCR's during each half cycle of the applied a-c line voltage. Each SCR can conduct, during each half cycle of the voltage applied thereto from the three-phase A-C power source, when the SCR's anode is positive relative to its cathode. However, conduction will not occur during a half cycle until gate current is supplied to the SCR's gate. At that instant, the SCR fires into conduction, or turns on, and permits load current to flow therethrough until the end of the half cycle at which time the anode-cathode voltage will be zero and the anode will no longer be positive with respect to the cathode. "Conduction angle", as used herein and in the appended claims, means the time during which any SCR is actually conducting (the "on time") during a 180° half-cycle of a supply voltage. The greater the angle or time delay between the start of a half cycle and the firing of the SCR into conduction, the less the conduction angle and the less alternating current that will be rectified and translated to the load circuit, namely, through the inverter to the a-c motor, thereby providing less d-c voltage across the output of the three-phase full wave rectifier bridge.

If controlled a-c power must be translated to a three-phase load, such as a three-phase a-c motor, a three-phase A-C switch may be utilized to vary the magnitude of the three alternating currents which flow to that load. Such a switch also includes three pairs of SCR's, each pair being connected in a respective one of the three line conductors over which the three phase voltages are received from the A-C power supply. By regulating the conduction angles of the six SCR's, the three alternating load or phase currents, supplied to the three-phase a-c motor, may be established at a desired level.

Regardless of the particular construction of the SCR network which adjusts the power flow, it is imperative that the gating signals for the SCR's be generated by circuitry which operates in precise synchronism with respect to the instants at which the phase voltages cross their a-c axis and thus have a zero instantaneous amplitude. The instants at which the SCR's are fired into conduction must be closely controlled and must be synchronized or keyed to the zero voltage points or crossings which will always occur at the same frequency and with the same time spacing or period from one zero crossing to the next, even though the phase voltages may not be perfectly sinusoidal in shape and may be contaminated with undesired harmonics, noise, transients or other distortion components. Unless the development of the gating signals for the SCR's is exactly synchronized to the zero voltage crossings of the three phase voltages, the timing of those gating signals will be incorrect and the SCR's will be triggered into conduction at the wrong times, resulting in an erroneous and undesired level of power flow to the load circuit. When the power flow cannot be properly regulated and held at a desired level, the reliability and performance of the entire system suffers substantially. Such misfiring of the SCR's can be caused by distortion components in the phase voltages. The gating may be too advanced or too retarded. If a relatively small conduction angle is required to achieve the desired power flow, the SCR's should be gated on near the end of each half cycle. A retarded gating signal could even allow gating near the start of the next half cycle, and this would effect much advanced gating for that next half cycle with a resultant surge in power flow which may damage or destroy some of the circuit components (such as the switching devices in an inverter) in the load.

Unfortunately, the previously developed SCR control systems for controlling the flow of three-phase A-C power are plagued by this problem. Such prior systems require relatively "clean" and sinusoidal shaped line voltages to operate properly. Distortion components on the power line deleteriously affect the operation of those prior systems to the extent that they cannot even be used in many power distribution systems where the three-phase line voltage is subject to distortion components.

This problem has been overcome by the present invention. The disclosed control system ensures that line voltage disturbances and distortions will not affect the power flow to the load circuit. The present invention provides a highly reliable control system which is immune to three-phase A-C power line distortions.

Previously-developed SCR control systems for three-phase power develop the gating signals for each phase by means of circuitry which is driven or operated only by that phase. In other words, individual and independently operated control circuits are employed for each of the three phase voltages, thereby requiring three complete and separate control circuits each having the same construction and each being controlled by a different one of the three phase voltages. In accordance with another aspect of the invention, a significant improvement over these prior systems is achieved in that a substantial portion of the control system is common to all three phases and yet is controlled by only one of the phase voltages. This results in a very efficient system, being considerably simpler and less expensive in construction and employing many fewer circuit components than the previous systems.

SUMMARY OF THE INVENTION

The control system of the present invention controls the conduction angles of three pairs of SCR's (connected in the form of either a three-phase full wave rectifier bridge or a three-phase A-C switch), to each of which pairs is applied a respective assigned one of the three alternating sinusoidal phase voltages of a three-phase A-C power supply, in order to regulate the power flow from the power supply to a load circuit, which receives d-c power from the bridge configuration and a-c power from the switch configuration. The control system comprises means for developing, from a predetermined one of the alternating phase voltages, a reference waveform having amplitude excursions which are precisely synchronized to the zero voltage crossings of the predetermined phase voltage, despite the presence of any undesired harmonics, noise, transients or other distortion components in that phase voltage. There are means for developing, from the reference waveform, three phase-displaced square waves each of which effectively represents a respective assigned one of the three phase voltages and has amplitude excursions precisely synchronized to the zero voltage crossings of its assigned phase voltage. A d-c control voltage is provided which represents a desired power flow to the load circuit. Finally, the control system includes means responsive to the three square waves and to the d-c control voltage for producing gating signals for triggering the six SCR's into conduction at the angles necessary to deliver the desired power flow to the load circuit.

DESCRIPTION OF THE DRAWINGS

The features of the invention which are believed to be novel are set forth with particularity in the appended claims. The invention may best be understood, however, by reference to the following description in conjunction with the accompanying drawings in which:

FIG. 1 schematically illustrates a control system, constructed in accordance with one embodiment of the present invention, and the manner in which that control system controls an SCR network to regulate the power translated from a three-phase A-C power supply to a load circuit, the SCR network taking the form of a three-phase full wave rectifier bridge;

FIG. 2 illustrates a three-phase A-C switch and the manner in which it may be substituted for the rectifier bridge in FIG. 1; and, FIG. 3 depicts various voltage signal waveforms that will be helpful in understanding the operation of the three-phase control system. The voltage waveforms are identified by letter designations and the points or conductors in FIG. 1 where these various voltages appear are indicated by corresponding letters.

DESCRIPTION OF THE PREFERRED EMBODIMENT

Figure 3:
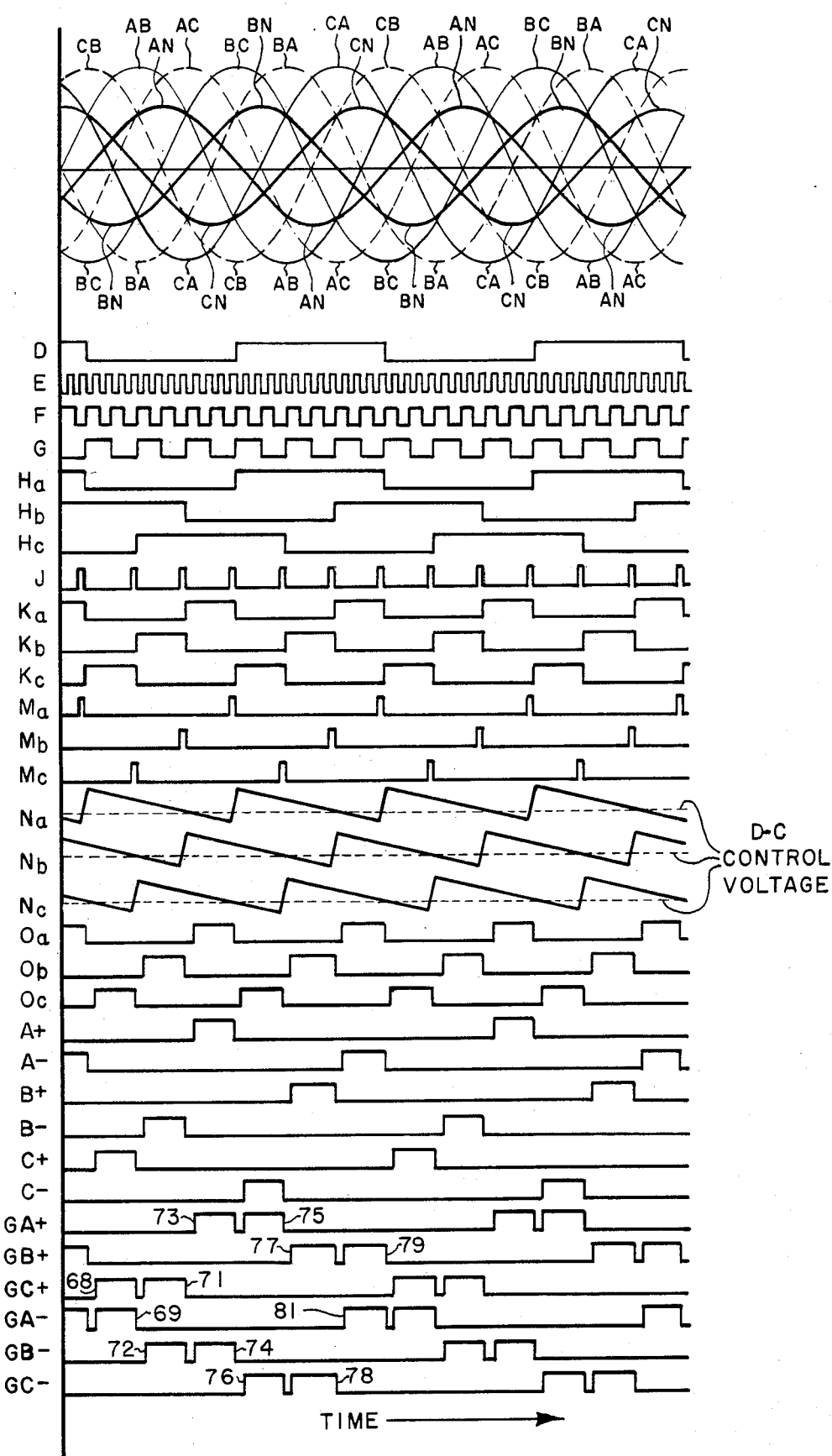

In FIG. 1 line conductors $L_1$, $L_2$ and $L_3$ connect to a conventional three-phase A-C power supply 8 which may be the usual A-C power mains, and thus provide three-phase a-c voltage, namely three alternating voltages varying in sinusoidal fashion and having the same amplitude and frequency but being phase-displaced with respect to each other by 120°. The frequency of the supply voltage will depend on the geographic area where the A-C power supply is provided (the frequency will usually be either 50 or 60 cycles per second or hertz), and the magnitude of the a-c line voltages may take any appropriate value depending on the characteristics of the load to be energized or driven. For convenience, the three phase voltages are designated phases A, B and C (or $\phi A$, $\phi B$ and $\phi C$) as indicated by the labels associated with the three line conductors $L_1$, $L_2$ and $L_3$ over which the three-phase power is received. Since there is no neutral line conductor from the A-C power supply, each of the phase voltages is actually a line-to-line voltage and appears on one of the line conductors $L_1$, $L_2$ and $L_3$ relative to another one of the line conductors. This is made clear by the sine waves illustrated at the top in FIG. 3. Each of the three higher amplitude sinusoidal waveforms drawn in full-line construction depicts one of the three phase voltages. The associated labels indicate the line conductor where each phase voltage is found, or measured, together with the reference line conductor. Specifically, the leading phase voltage in point of time may be considered phase A or $\phi A$ and is marked AB, meaning the voltage found on line conductor $L_1$ relative to that on line conductor $L_2$. Lagging by 120° is sinusoidal voltage waveform BC (phase B or $\phi B$) which is that appearing on conductor $L_2$ with respect to conductor $L_3$. Lagging the phase voltage BC by 120° is phase voltage CA (phase C or $\phi C$), measured at line conductor $L_3$ as referenced to conductor $L_1$. Of course, 180° counterparts for these phase voltages may be found by inverting the measurements, namely by observing the voltages on line conductors $L_2$, $L_3$ and $L_1$ relative to conductors $L_1$, $L_2$, and $L_3$, respectively. The phase inverted voltages, shown in FIG. 3 in dashed line construction, are appropriately labeled BA, CB and AC.

The primary windings of wye-connected transformer 10 are connected to the three line conductors so as to produce, across secondary winding 10a, the line-to-neutral voltage for phase A. This sinusoidal-shaped voltage is measured at the upper or ungrounded terminal of winding 10a relative to the ground plane, which will be zero volts, and is drawn in FIG. 3 and labeled AN, meaning phase A referenced to neutral or ground. As is well known, such a line-to-neutral voltage will lag its associated line-to-line phase voltage by 30° and will have an amplitude substantially less than the line-to-line voltage. Specifically, the line-to-neutral voltage will have an amplitude 1/1.732 times that of the associated line-to-line voltage. Although only line-to-neutral voltage AN is needed to operate the control system of the invention, as will be made apparent, the other two line-to-neutral voltages BN and CN for phases B and C, respectively, are illustrated in FIG. 3 and will be very helpful in gaining a complete understanding of the operation of the invention. If desired, the BN and CN voltages, which may be derived from the $\phi B$ and $\phi C$ primary windings of transformer 10, may be employed for other functions, such as checking phase rotation or sequence and phase loss.

The sinusoidal voltage AN is applied to band-pass filter 12 which is tuned to the fundamental frequency of the three-phase A-C power supply. It will be assumed, in the illustrated embodiment, that that frequency is 60 hertz. The band-pass filter introduces no phase shift whatsoever to the fundamental but attenuates both high and low frequencies. The output voltage of filter 12 will thus be the same as voltage AN and will be exactly in phase therewith. If there are any undesired distortion components in phase A, such as harmonics, noise, transients, etc., those components would appear in voltage AN but would be removed by filter 12 so that its output signal would be "clean" and sinusoidal shaped. Of significant importance is the fact that the zero voltage crossings in the filter's output signal will be exactly in phase with the zero voltage crossings of the line-to-neutral fundamental voltage AN. Preferably, filter 12 is constructed by cascading low-pass and high-pass filters, with the high-pass filter preceding the low-pass filter. Since voltage AN is illustrated in FIG. 3 as being perfectly sinusoidal and distortion-free, that waveform also depicts the voltage appearing at the output of band-pass filter 12 and is so indicated in FIG. 1.

The output of filter 12 is applied to a squaring amplifier 13, preferably taking the form of a schmitt trigger, which effectively detects the zero voltage crossings of the sinusoidal voltage AN and converts that voltage to a voltage of square waveform as illustrated by waveform D in FIG. 3. The output square wave voltage D of squaring amplifier 13 is in exact phase with voltage AN in that the amplitude excursions of waveform D occur in precise time coincidence with the zero voltage crossings of voltage AN. Since the zero voltage crossings of voltage AN lag the corresponding crossings of phase voltage AB by exactly 30°, the amplitude excursions of voltage waveform D are precisely keyed or synchronized to the zero voltage crossings of phase voltage AB. Moreover, since there is a fixed phase relationship between all three of the line-to-line phase voltages and all three of the line-to-neutral voltages, regardless of the presence of undesired distortion components in any of those voltages, the amplitude excursions of waveform D will also be synchronized to the zero voltage crossings of the four voltages BC, CA, BN and CN. It will therefore be appreciated that the amplitude excursions of waveform D can be employed to determine the timing of the zero voltage crossings of those four voltages. In other words, waveform D contains enough information to effectively represent all of the phase voltages and, as will be made apparent, this will permit the development of precisely timed gating signals for all six of the SCR's in the three-phase full wave rectifier bridge 15 illustrated in FIG. 1, the output of which bridge powers a load circuit 14 which may, for example, comprise an inverter which in turn drives an a-c motor. There will be no need to develop and to employ voltages BN and CN, but as will be seen the appearance of waveforms BN and CN in FIG. 3 will assist in obtaining a complete understanding of the invention. Since square wave D constitutes the basic reference to which all of the other signals in the control system are keyed or synchronized, waveform D will be termed the "reference waveform".

To produce the required gating signals, the voltage represented by reference waveform D is applied to a first input of a phase locked loop 16 whose output is connected through an inverter 17 and a pair of series-connected divide-by-2 counters 18 and 19 to the input of a divide-by-6 ring counter 21, an output of which is connected back to a second input of phase locked loop 16. Suitable counters, for counters 18 and 19, may be found in an integrated circuit made by Motorola under the designation MC14013BCL. An integrated circuit, designated CD4076BF and manufactured by RCA, may be employed to function as ring counter 21. Phase locked loop 16 essentially includes a phase detector coupled through a lag-lead filter to a voltage controlled oscillator and is manufactured as an integrated circuit by Motorola under the designation MC14046BCL and by RCA under the designation CD4046BF. A phase locked loop functions to maintain the phase and frequency of the signal on its second (or feedback) input exactly like the phase and frequency of the signal on its first input, regardless of what countdown takes place in the feedback loop. When the signal on the first input is a square wave having a 50% duty cycle, as is the case with waveform D, the signals on the two inputs of a phase locked loop will be identical in every respect, namely, waveshape, phase and frequency. In effect, the signal waveform on the first input is "cloned" on the second or feedback input. No matter what occurs in the feedback loop between the output of the phase locked loop and its second input, the signal on the second input will always be the same as the signal on the first input when the first input signal has a 50% duty cycle. The output signal of the phase locked loop will, however, be determined by counters 18, 19 and 21 in the feedback loop. With those counters producing a total division of 24, the frequency of the output signal of phase locked loop 16 will be 24 times the frequency of the signal denoted by waveform D, namely, 60×24 or 1440 hertz and these relatively high frequency pulses will have a 50% duty cycle like the pulses of reference waveform D. This 1440 hertz output signal is shown by waveform E in FIG. 3 and the high frequency pulses of that signal may be referred to as "timing pulses" since they are employed, as will be explained, in producing the gating signals to achieve precise firing of the six SCR's in rectifier bridge 15.

Considering one full cycle (positive and negative excursions) of a voltage waveform such as AN or D occurring over 360°, it is to be noted that a positive-going timing pulse of waveform E occurs every 15°, with each pulse having a duration of 7.5°. Observe also that the phase locked loop ensures that a timing pulse will occur immediately before each zero voltage crossing of each of the line-to-neutral voltages AN, BN and CN. The trailing edges of those pulses will occur in exact time coincidence with the associated zero crossings. This is clearly seen for voltage AN by comparing waveform E with reference waveform D whose amplitude excursions occur at the zero crossings of voltage AN. It will thus be apparent that the periodically recurring timing pulses of voltage waveform E are precisely related in frequency and phase to each of the three phase voltages and to each of the three line-to-neutral voltages. The timing pulses will be exactly synchronized to the zero crossings of those six sinusoidal voltages.

Inverter 17 inverts the phase of the timing pulses so that the 180° counterpart of waveform E (namely, $\overline{E}$) will be applied to the input of divide-by-2 counter 18, the output signal of which is illustrated by waveform F. Divide-by-2 counter 19 produces, from waveform F, the signal of waveform G for application to the input of divide-by-6 ring counter 21. In response to that input signal, ring counter 21 develops at its three outputs the three phase-displaced (by 120°) square waves $H_a$, $H_b$ and $H_c$, each having a frequency of 60 hertz. Square wave $H_a$ is applied to the second or feedback input of phase locked loop 16 and, as mentioned hereinbefore, will be identical in every respect to the reference waveform D applied to the first input of circuit 16. This absolute identity is clearly seen by comparing waveforms $H_a$ and D in FIG. 3. Hence, square wave $H_a$ bears the same information as waveform D. Specifically, the amplitude excursions of waveform $H_a$ will occur in exact time coincidence with the zero voltage crossings of voltage AN and will lag the zero crossings of phase voltage AB by 30°. Waveform $H_a$ is thus synchronized to and effectively represents phase voltage AB or phase A. Since square wave $H_b$ lags square wave $H_a$ by precisely 120°, the amplitude excursions of square wave $H_b$ will occur in exact time coincidence with the zero voltage crossings of line-to-neutral voltage BN which in turn lag the zero crossings of phase voltage BC by 30°. Square wave $H_b$ therefore represents phase voltage BC or phase B. It will also be apparent that the amplitude excursions of square wave $H_c$ occur in time coincidence with the zero crossings of line-to-neutral voltage CN and are therefore synchronized to the zero crossings of phase voltage CA. Square wave $H_c$ consequently represents phase voltage CA or phase C.

It will now be appreciated that by using only one phase signal (phase A) as a reference, three phase-displaced square wave signals $H_a$, $H_b$ and $H_c$ have been generated which effectively represent the three phases, each being a squared up representation of a respective assigned one of the three phase voltages. This is a salient feature of the invention. All of the described timing circuitry is only tied to one phase and yet all three phases will be controlled. Obviously, this unique approach results in substantial circuit economies since considerably fewer circuit components are needed compared to prior systems. Furthermore, any undesired distortion components in any of the three phase voltages are effectively rendered harmless. By eliminating the phase A undesired components in filter 12 and then producing the three square waves $H_a$, $H_b$ and $H_c$ from the output of the filter, the control system is made immune to the distortion components in all three phases.

As mentioned, a positive-going timing pulse of waveform E occurs immediately before each zero crossing of voltages AN, BN and CN and thus just before the amplitude excursions of square wave voltages $H_a$, $H_b$ and $H_c$. One of those voltage pulses will occur every 60° and they are selected by AND gates 23 and 24. More particularly, AND gate 23 receives the phase inverted or 180° counterparts of waveforms F and G (namely, $\overline{F}$ and $\overline{G}$) and produces therefrom pulses for application to one of the inputs of AND gate 24, whose other input receives the timing pulses of waveform E. Hence, any time waveforms F and G are both at their relatively low levels (signals $\overline{F}$ and $\overline{G}$ thereby being at their relatively high levels), a positive-going timing pulse of waveform E will be developed at the output of AND gate 24, as illustrated by waveform J in FIG. 3.

Meanwhile, exclusive NOR gates 25, 26 and 27 produce, from square wave signals $H_a$, $H_b$ and $H_c$, the signals of waveforms $K_a$, $K_b$ and $K_c$, respectively. An exclusive NOR gate produces a relatively low level output (logic 0) if one of its two inputs is at a relatively high level (logic 1) while its other input is logic 0. In other words, when either input is logic 1, but not both, the output will be logic 0. If both inputs are the same (either logic 0 or logic 1), the output will be relatively high or logic 1. Thus, each positive-going pulse of waveform $K_a$ occurs when both of waveforms $H_a$ and $H_b$ are at the same logic level, either logic 1 or logic 0. Similarly, the positive-going pulses of waveform $K_b$ occur when square waves $H_b$ and $H_c$ are the same, and the positive-going pulses of waveform $K_c$ occur when square waves $H_c$ and $H_a$ are at the same level.

AND gates 31, 32 and 33 employ respective ones of signals $K_a$, $K_b$ and $K_c$ to select pulses from waveform J, thereby producing the signals of waveforms $M_a$, $M_b$ and $M_c$ at the outputs of gates 31, 32 and 33, respectively. It will be observed that the positive-going pulses of waveform $M_a$ occur just before an amplitude excursion of square wave $H_a$, while the pulses of waveforms $M_b$ and $M_c$ occur immediately prior to amplitude excursions of square waves $H_b$ and $H_c$, respectively. The signals of waveforms $M_a$, $M_b$ and $M_c$ are consequently phase displaced from each other by 120° and each is associated with a respective one of the three phases, the pulses of each wave-form periodically recurring at twice the frequency of the A-C power supply 8. As will be made apparent, the pulses of waveforms $M_a$, $M_b$ and $M_c$ are employed to generate ramp-shaped signals and are appropriately called "ramp reset signals". The circuitry provided by gates 23–27 and 31–33 is thus labeled "ramp reset logic 28".

Suitable ramp forming circuits may fulfill the functions of circuits 34, 35 and 36 to generate, under the control of the ramp reset signals $M_a$, $M_b$ and $M_c$, the three phase-displaced, ramp-shaped signals $N_a$, $N_b$ and $N_c$, each of which has a frequency of 120 hertz and is associated with or related to an assigned respective one of the three phases. One such ramp forming circuit is shown and described in detail in U.S. Pat. No. 4,315,305, issued Feb. 9, 1982 in the name of Edward C. Siemon, and assigned to the present assignee. Note that each of the ramp-shaped pulses of waveform $N_a$ extends substantially throughout, and occurs in time coincidence with, an entire half cycle of the associated line-to-neutral voltage AN. In like manner, the ramp-shaped pulses of waveforms $N_b$ and $N_c$ extend throughout, and occur during, the half cycles of the associated voltages BN and CN, respectively.

The ramp-shaped signals $N_a$, $N_b$ and $N_c$ are applied to the inverting or (−) inputs of respectives ones of voltage comparators 37, 38 and 39, to the non-inverting or (+) inputs of which is applied a d-c control voltage whose magnitude represents a desired power flow from the A-C power supply 8 and through the rectifier bridge 15 to the load circuit 14. Of course, the d-c control voltage may be provided by any appropriate source. It may, for example, be derived from a simple potentiometer which is adjusted to change the level of the control voltage when the power flow to the load is to be changed, or the d-c control voltage may take the form of an error voltage derived by effectively comparing the actual d-c voltage at the output of bridge 15 with a desired set point voltage, the error voltage automatically changing any time a correction is needed to return the d-c voltage back to the desired level. A control arrangement, in which such an error voltage is developed, is illustrated in the aforementioned U.S. Pat. No. 4,315,305. The d-c control voltage, applied to comparators 37, 38 and 39, may also be developed by sensing some parameter or characteristic of the load circuit in order to automatically control the power delivered through rectifier bridge 15 in response to, and under control of, that sensed information.

The amplitude level of the d-c control voltage, regardless of where it is at any given time, will fall somewhere within the amplitude range covered by the ramp-shaped pulses of waveforms $N_a$, $N_b$ and $N_c$. For convenience of illustration and explanation, the d-c control voltage has been superimposed in dashed construction on the ramp-shaped signals in FIG. 3. As will be seen, the particular amplitude of the d-c control voltage selected for illustration will result in a relatively low magnitude D-C output voltage from rectifier bridge 15 and a corresponding relatively low power flow to load circuit 14.

At the beginning of a cycle of waveform $N_a$ when a ramp-shaped pulse is just starting to decrease, the voltage at the (−) input of comparator 37 will be greater than (or positive with respect to) the d-c control voltage at the comparator's (+) input, resulting in a relatively low level output voltage as shown by waveform $O_a$. At some point during the cycle, as determined by the magnitude of the d-c control voltage, the ramp voltage will drop below the d-c control voltage and comparator 37 will abruptly switch from a low level to a high level output voltage where it will remain until the end of the ramp and the end of the cycle (as shown in waveform $O_a$), whereupon the comparator returns to its low level output voltage. The leading edge of each positive-going pulse in waveform $O_a$ is therefore adjustable or variable in time within a half cycle of line-to-neutral voltage AN, as determined by the amplitude of the d-c control voltage, whereas the trailing edge of each $O_a$ pulse is fixed and will always occur when voltage AN completes a half cycle and crosses its a-c axis. Thus, if the amplitude of the d-c control voltage is increased, the positive-going pulses of waveform $O_a$ become wider and their leading edges are shifted to the left in FIG. 3. Conversely, if the control voltage level is lowered, the $O_a$ pulses become narrower and their leading edges move to the right in FIG. 3. In any event, the trailing edges of the $O_a$ pulses are always in time coincidence with the zero voltage crossings of voltage AN.

In like fashion, comparator 38 switches from a low level output to a high level output at the instant that each ramp-shaped pulse of waveform $N_b$ decreases to the level of the d-c control voltage and stays at the high level until the termination of the ramp, thereby generating the positive-going pulses of waveform $O_b$ at the output of comparator 38. The leading edge of each $O_b$ pulse is adjustable in time, as determined by the control voltage, and occurs during a half cycle of voltage BN, while the trailing edge of each of those pulses is fixed and occurs when voltage BN completes the half cycle and crosses zero voltage. Similarly, comparator 39 responds to the d-c control voltage and to the ramp-shaped signal $N_c$ and develops the positive-going pulses of waveform $O_c$, whose leading edges occur some time during the half cycles of line-to-neutral voltage CN and whose trailing edges occur in time coincidence with the zero voltage crossings of voltage CN. Of course, with the described arrangement the three phase-displaced signals $O_a$, $O_b$ and $O_c$ will all be absolutely identical in wave shape and frequency (120 hertz). In a manner to be explained, the positive-going pulses of waveforms $O_a$, $O_b$ and $O_c$ are eventually distributed or channeled to the gates of the six SCR's of bridge 15 to provide the gating signals for triggering the SCR's into conduction at the angles necessary to deliver the desired power flow to load circuit 14. For this reason, the pulses of waveforms $O_a$, $O_b$ and $O_c$ will be referred to as "gating pulses".

By observing the sinusoidal waveforms depicting the three phase voltages in FIG. 3, it is evident that the anodes of the six SCR's are established at voltages more positive than that on their associated cathodes at six different time intervals during a complete cycle of the three-phase A-C source. Moreover, it will be appreciated that every time an SCR is turned on to permit current flow in the direction from the SCR's anode to its cathode, another SCR in the rectifier bridge must also be fired into conduction to complete a conduction path for the load current. The gating pulses of waveforms $O_a$, $O_b$ and $O_c$ therefore must be combined and supplied to the appropriate SCR's to achieve the required gating.

To this end, steering logic circuitry (circuits 41, 42 and 43), comprising conventional AND gates and inverters, effectively separates and steers the gating pulses (waveforms $O_a$, $O_b$ and $O_c$) from the three comparators 37, 38 and 39 to the six outputs of the logic circuitry, three of the outputs providing the gating pulses occurring during the positive half cycles of respective ones of the three line-to-neutral voltages AN, BN and CN, while the other three outputs provide the gating pulses occurring during the negative half cycles of respective ones of the three line-to-neutral voltages, the gating pulses at each output thereby occurring at the same frequency as the line-to-neutral voltages. In short, each of signals $O_a$, $O_b$ and $O_c$ is effectively divided into two signals. To elucidate, steering logic circuit 41 operates in response to the gating pulses of waveform $O_a$ and to square wave $H_a$ to produce, at the upper output of circuit 41, only the $O_a$ pulses that occur when square wave $H_a$ is at its low voltage level. Those selected gating pulses are depicted by waveform A+ in FIG. 3. The intervening pulses of waveform $O_a$, that occur when square wave $H_a$ is at its high voltage level, are selected by circuit 41 and produced at the circuit's lower output, as indicated by waveform A− in FIG. 3. Steering logic circuit 42 functions in similar manner in response to square wave $H_b$ and to the gating pulses of waveform $O_b$ to provide the pulses of waveform B+ at the circuit's upper output and the pulses of waveform B− at the lower output. Waveforms $H_c$ and $O_c$ operate steering logic circuit 43 so as to develop the pulses of waveform C+ at the circuit's upper output and the pulses of waveform C− at the lower output.

The six outputs of the steering logic circuits 41, 42 and 43 are applied to the inputs of the six OR gates 51–56 in order to produce the six gating signals illustrated by waveforms GA+, GB+, GC+, GA−, GB− and GC− in FIG. 3. More particularly, OR gate 51 combines the gating pulses of waveforms A+ and C− to develop the GA+ gating signal. Gate 52 effectively adds the A− pulses and the B+ gating pulses to provide the gating signal of waveform GB+. The B− pulses and the C+ pulses are ored in gate 53 to generate the GC+ gating signal. The A− pulses and the C+ pulses are combined by gate 54 to provide the GA− gating signal. OR gate 55 adds the B− and A+ gating pulses to develop the GB− gating signal. Finally, the gating pulses of waveforms C− and B+ are combined by OR gate 56 to produce the gating signal of waveform GC−. Note that each of the OR gates 51–56 receives the gating pulses occurring during the positive half cycles of one of the line-to-neutral voltages AN, BN and CN and also the gating pulses occurring during the negative half cycles of one of the other line-to-neutral voltages, each of the six or gates thereby producing a pair of gating pulses during each cycle. As will be appreciated, such double pulsing is employed so that at least two of the SCR's of bridge 15 are fired into conduction simultaneously to provide a complete conduction path through the bridge for the load current.

SCR gate drivers 61–66 connect to the outputs of respective ones of OR gates 51–56 to produce appropriate gating current for the SCR's in response to the gating voltage signals developed at the outputs of the gates. Specifically, each of the six gate drivers 61, 62, 63, 64, 65 and 66 is connected to the gate of a respective one of the six SCR's A+, B+, C+, A−, B− and C− in bridge 15. The timing of the gating current supplied by the gate drivers is, of course, controlled by the six gating signals of waveforms GA+, GB+, GC+, GA−, GB− and GC−. Consequently, those waveforms will indicate the instants at which the SCR's are triggered into conduction. By comparing the six gating signal waveforms, GA+ through GC−, it will be realized tha every time gating current is translated to the gate of SCR A+ to trigger that SCR into conduction, gating current is simultaneously delivered to either the gate of SCR B− or to the gate of SCR C−. Similarly, when a gating pulse is applied to SCR B+ to fire that SCR into conduction, a gating pulse is simultaneously applied to either SCR A− or SCR C−. Furthermore, when SCR C+ is gated into conduction, gating current is supplied at the same time to either SCR A− or SCR B−. All of this simultaneous gating is required so that complete conduction paths will exist for the load current through bridge 15.

Considering now the specific example illustrated by the gating signal waveforms in FIG. 3, in response to the leading edge of the first-occurring gating pulse (labeled 68) in waveform GC+, gating current will be fed to SCR C+. At that same instant, the leading edge of the first-occurring complete gating pulse (designated 69) in waveform GA− causes the translation of gating current to the gate of SCR A−. At that time, line conductor $L_3$ will be positive relative to line conductor $L_1$ (as shown by phase voltage CA in FIG. 3), the anodes of both SCR's C+ and A− thereby being positive with respect to their cathodes. The SCR's will thus be fired into conduction, conducting load current as long as their anodes remain positive relative to their cathodes, namely as long as the SCR's remain in a forward biased state. Of course, this interval will be relatively short since phase voltage CA is only about 24° away from completing a positive half cycle when SCR's C+ and A− begin conducting. The SCR's will continue to conduct during that 24° interval until the half cycle is completed, at which time the voltage across both of the SCR's drops to zero and the SCR's are no longer forward biased. Hence, for the example shown, each of SCR's C+ and A− will have a conduction angle of approximately 24°. During that conduction angle power will flow to load circuit 14, load current being translated in the direction from conductor $L_3$ through SCR C+ and load circuit 14 and then back through SCR A− to conductor $L_1$.

When phase voltage CA crosses zero and SCR's C+ and A− cease conducting load current, power flow to the load circuit will be temporarily arrested. It will resume, however, in response to the leading edge of pulse 71 in waveform GC+ and to the leading edge of the first-occurring pulse 72 in waveform GB−. At that instant, line conductor $L_2$ will be negative relative to line conductor $L_3$ (as shown by phase voltage BC) or, viewed differently, conductor $L_3$ will be positive with respect to conductor $L_2$ as indicated by waveform CB shown in dashed construction in FIG. 3. Gating pulse 71 therefore triggers C+ into conduction and the concurrently-occurring pulse 72 gates SCR B− into conduction, causing load current to flow in the direction from conductor $L_3$ through SCR C+ and load circuit 14 and then back through SCR B− to conductor $L_2$. Of course, the conduction angle of each of those SCR's will also be about 24°, terminating when phase voltage BC reaches zero volts.

Once again power flow to the load will be temporarily halted, but will resume in response to the leading edges of the concurrently-occurring pulses 73 and 74 in waveforms GA+ and GB−, respectively, which turn on SCR's A+ and B− at an instant during a positive half cycle of phase voltage AB when line conductor $L_1$ is positive relative to line conductor $L_2$. Load current thus flows in the direction from conductor $L_1$ through SCR A+ and load circuit 14 and then back through SCR B− to line conductor $L_2$, this current continuing to flow during the 24° interval during which SCR's A+ and B− are established in their forward biased conditions, namely until phase voltage AB drops down to zero volts.

Upon the termination of current flow through SCR's A+ and B−, power flow to the load is withheld until the occurrence of the leading edges of the concurrently-occurring pulses 75 and 76 in waveforms GA+ and GC−, respectively, which gate SCR's A+ and C− into conduction at a time during a negative half cycle of phase voltage CA when conductor $L_3$ is negative relative to conductor $L_1$ or, viewed differently, when conductor $L_1$ is positive relative to conductor $L_3$, as indicated by waveform AC shown in dashed construction in FIG. 3. Load current consequently flows from conductor $L_1$ and through SCR A+, load circuit 14 and SCR C− to conductor $L_3$ until phase voltage CA reaches zero volts.

It will now be apparent that pulse 77 in waveform GB+ and pulse 78 in waveform GC− trigger SCR's B+ and C− into conduction during a positive half cycle of phase voltage BC when conductor $L_2$ is positive relative to conductor $L_3$, causing load current to flow in the direction from conductor $L_2$ and through SCR b+, load circuit 14 and SCR C− to conductor $L_3$. To complete a cycle of operation, gating pulses 79 and 81 of waveforms GB+ and GA−, respectively, fire SCR's B+ and A− into conduction during a negative half cycle of phase voltage AB when conductor L1 is negative relative to conductor L2 or, stated differently, when conductor $L_2$ is positive relative to conductor $L_1$ (see dashed waveform BA). Load current will be translated in response to the gating pulses, and during the 24° conduction angle, from conductor $L_2$ and through SCR B+, load circuit 14, and SCR A− to conductor $L_1$.

It will now be understood that when increased power flow to the load is desired, the leading edges of all of the pulses in the six gating signal waveforms GA+−GC− will be advanced in time (namely will move to the left in FIG. 3), while their trailing edges will remain fixed. Each gating pulse therefore increases in width, but only to the left in FIG. 3, as the conduction angle is increased. When the conduction angle of each SCR is increased to about 36° of each half cycle of each phase voltage, the double pulses of the gating signal waveforms will merge or overlap, as a result of which single and relatively wide gating pulses will be applied to the SCR's for medium to relatively large conduction angles. The relatively low 24° conduction angle, employed in the operational description of the invention, was selected so that double pulses would be included in the gating signals.

The gating current signals developed by gate drivers 61–66 may be supplied, without any alteration or modification whatsoever, to the six SCR's of the three-phase A-C switch 85 in FIG. 2 to regulate the flow of alternating load current from the three-phase A-C power supply 8 to three-phase load circuit 86. A-C switch 85 is of conventional construction and may be employed in any control system where it is desired to control the translation of three-phase current to a load. For example, such an A-C switch is utilized in U.S. Pat. No. 4,057,842, issued Nov. 8, 1977, in the name of Bruce K. Bauman et al, and assigned to the present assignee. In that patent, the load comprises a three-phase a-c motor which may function as the compressor motor in a large capacity air-conditioning system.

While particular embodiments of the invention have been shown and described, modifications may be made, and it is intended in the appended claims to cover all such modifications as may fall within the true spirit and scope of the invention.

We claim:

1. A control system for controlling the conduction angles of three pairs of SCR's, to each of which pairs is applied a respective assigned one of the three alternating sinusoidal phase voltages of a three-phase A-C power supply, in order to regulate the power flow from the power supply to a load circuit, comprising:

a transformer for deriving the corresponding line-to-neutral voltage for a predetermined one of the alternating phase voltages;

a band-pass filter for attenuating, in the derived line-to-neutral voltage, frequencies above and below the voltage's fundamental frequency, while at the same time introducing no phase shift to that fundamental frequency, the output signal from the band-pass filter thereby being sinusoidal shaped and identical to the predetermined phase voltage except that any harmonics, noise, transients or other distortions in the phase voltage are not present in the filter's output signal;

means for effectively detecting the zero voltage crossings in the filter's sinusoidal output signal and producing a square wave signal which constitutes a reference voltage waveform having the same frequency as said phase voltages and having amplitude excursions which are precisely synchronized to the zero voltage crossings of the predetermined phase voltage;

means for developing, from said reference voltage waveform, three phase-displaced square wave signals which are phase-displaced with respect to each other by 120° and have the same frequency as said phase voltages, each of the three phase-displaced square wave signals having its amplitude excursions occurring in exact time coincidence with the zero voltage crossings of a respective one of the three line-to-neutral voltages for the three phase voltages;

means responsive to the three phase-displaced square wave signals for developing three phase-displaced, ramp-shaped analog signals each of which corresponds to and is in phase with a respective associated one of the three square wave signals, each ramp-shaped analog signal having a linearly changing ramp-shaped pulse during each half cycle of its associated square wave signal;

means for supplying a d-c analog control voltage representing a desired power flow to the load circuit;

and means for comparing said d-c control voltage to each of the three ramp-shaped analog signals and for producing, from the comparisons, gating signals for triggering the six SCR's into conduction at the angles necessary to delivery the desired power flow to the load circuit.

2. A control system according to claim 1 wherein said means for developing said three phase-displaced square wave signals comprises a phase locked loop having a first one of its inputs connected to receive said reference voltage waveform and having its output connected to counting circuitry, including a ring counter, which ring counter produces the three square wave signals, an output of the ring counter being connected to a second input of the phase locked loop to apply thereto a feedback signal which will be maintained, by the phase locked loop, identical in waveshape, phase and frequency to the reference voltage waveform.

3. A control system according to claim 2 wherein said counting circuitry causes the phase locked loop to generate a series of timing pulses periodically recurring at a frequency very high compared to, and a multiple of, the frequency of the A-C power supply voltage and being precisely synchronized to the zero voltage crossings of the three phase voltages, and wherein the operation of said means for producing said gating signals is keyed to said timing pulses.

4. A control system according to claim 2 wherein said counting circuitry functions like a divide-by-24 counter in order that the output signal of said phase locked loop will constitute a series of relatively high frequency pulses periodically recurring at a frequency 24 times the frequency of the predetermined phase voltage, with pulses thereby occurring every 15° of the predermined phase voltage and having a 50% duty cycle, and being precisely synchronized to, and having a fixed phase relationship with respect to, the zero voltage crossings of the three phase voltages, and wherein said timing pulses are employed in producing said gating signals in order to achieve precise firing of the six SCR's, the conduction angles of the SCR's being proportional to the duration of the gating signals.

5. A control system according to claim 1 wherein the six SCR's are connected to form a three-phase full wave rectifier bridge which produces, from the three-phase A-C power supply, a D-C voltage of a magnitude determined by the conduction angles of the six SCR's, direct current thereby flowing to the load circuit to effect operation thereof.

6. A control system according to claim 1 wherein said three phase voltages are line-to-line voltages received over three line conductors, and wherein the six SCR's are connected to form a three-phase A-C switch with each of the three pairs of SCR's being connected in a respective one of the three line conductors in order to adjust the magnitude of the alternating current flowing to the load circuit as determined by the conduction angles of the six SCR's.

7. A control system for controlling the conduction angles of three pairs of SCR's, to each of which pairs is applied a respective assigned one of the three alternating sinusoidal phase voltages of a three-phase A-C power supply, in order to regulate the power flow from the power supply to a load circuit, comprising:

means for developing, from a predetermined one of the alternating phase voltages, a reference voltage waveform having amplitude excursions which are precisely synchronized to the zero voltage crossings of the predetermined phase voltage, despite the presence of any undesired harmonics, noise, transients or other distortion components in that phase voltage;

means for developing, from said reference voltage waveform, three phase-displaced square wave signals each of which is phase-displaced from the other two square wave signals by 120° and effectively represents a respective assigned one of the three phase voltages, each of said three square wave signals having the same frequency as the three-phase A-C power supply voltage and having its amplitude excursions occurring in exact time coincidence with the zero voltage crossings of the line-to-neutral voltage for its assigned phase voltage, said means for developing said three phase-displaced square wave signals also producing a series of timing pulses periodically recurring at a frequency very high compared to, and a multiple of, the frequency of the three-phase A-C power supply voltage and being precisely synchronized to the zero voltage crossings of the three phase voltages;

means for supplying a d-c control voltage representing a desired power flow to the load circuit;

a ramp reset logic circuit responsive to said three square wave signals and to said timing pulses for producing three phase-displaced ramp reset signals each of which is associated with a respective one of the three square wave signals and has a series of reset pulses periodically recurring at twice the frequency of the A-C power supply voltage, each reset pulse occurring immediately prior to an amplitude excursion in the associated square wave signal;

ramp forming circuitry for developing, from said ramp reset signals, three phase-displaced ramp-shaped signals each of which is associated with a respective one of the three line-to-neutral voltages and has a series of ramp-shaped pulses periodically recurring at twice the frequency of the A-C power supply voltage, each ramp-shaped pulse extending substantially throughout, and occurring in time coincidence with, an entire half cycle of the associated line-to-neutral voltage;

and means including a series of three comparators, each of which compares said d-c control voltage with a respective one of said three ramp-shaped signals, for producing gating signals for triggering the six SCR's into conduction at the angles necessary to deliver the desired power flow to the load circuit.

8. A control system according to claim 7 wherein each of said three comparators produces a series of gating pulses periodically recurring at a frequency twice that of the A-C power supply voltage and each pulse occurring during a half cycle of a respective associated one of the three line-to-neutral voltages, the three output signals of the comparators thereby being phase-displaced from each other; wherein steering logic circuitry, having six outputs, effectively separates and steers the gating pulses from the three comparators to those six outputs, three of the outputs providing the gating pulses occurring during the positive half cycles of respective ones of the three line-to-neutral voltages, while the other three outputs provide the gating pulses occurring during the negative half cycles of respective ones of the three line-to-neutral voltages, the gating pulses at each output thereby occurring at the same frequency as the line-to-neutral voltages; wherein each of the six outputs of said steering logic circuitry is connected to two different ones of six OR gates such that each OR gate receives the gating pulses occurring during the positive half cycles of one of the line-to-neutral voltages and also the gating pulses occurring during the negative half cycles of one of the other line-to-neutral voltages, each of said six OR gates thereby producing a pair of gating pulses during each cycle; and wherein said six OR gates are connected to respective ones of six SCR gate drivers each of which produces a gating signal for controlling a respective one of the six SCR's, at least two of the SCR's being fired into conduction simultaneously in order to provide a conduction path for the load current.

* * * * *